US012452615B2

(12) United States Patent
Ma

(10) Patent No.: US 12,452,615 B2
(45) Date of Patent: Oct. 21, 2025

(54) HEARING DEVICE HAVING BILATERAL BEAMFORMING WITH BINAURAL CUES

(71) Applicant: GN Hearing A/S, Ballerup (DK)

(72) Inventor: Changxue Ma, Barrington, IL (US)

(73) Assignee: GN Hearing A/S, Ballerup (DK)

( * ) Notice: Subject to any disclaimer, the term of this patent is extended or adjusted under 35 U.S.C. 154(b) by 329 days.

(21) Appl. No.: 18/325,651

(22) Filed: May 30, 2023

(65) Prior Publication Data

US 2024/0406642 A1 Dec. 5, 2024

(51) Int. Cl.
*H04R 25/00* (2006.01)

(52) U.S. Cl.
CPC ......... *H04R 25/552* (2013.01); *H04R 25/407* (2013.01); *H04R 25/554* (2013.01); *H04R 2225/43* (2013.01); *H04R 2430/23* (2013.01)

(58) Field of Classification Search
CPC ............ H04R 2225/43; H04R 2225/53; H04R 2430/23; H04R 25/407; H04R 25/552; H04R 25/554; H04R 3/005
USPC .......................................................... 381/312
See application file for complete search history.

(56) References Cited

U.S. PATENT DOCUMENTS 12,041,417 B2 * 7/2024 Ma .......................... G01S 11/14
2008/0089523 A1 4/2008 Roeck
2017/0180879 A1 * 6/2017 Petersen .............. H04R 25/453
2019/0394577 A1 * 12/2019 Pedersen ................ H04R 25/65
2022/0240026 A1 * 7/2022 Zahedi ................. H04R 25/405
2023/0396936 A1 * 12/2023 Ma .......................... G01S 3/802
2024/0284124 A1 * 8/2024 Ma .......................... H04R 25/43
2024/0406642 A1 * 12/2024 Ma ....................... H04R 25/407

FOREIGN PATENT DOCUMENTS

CN 117177119 A * 12/2023 ........... H04R 25/407
CN 118509779 A * 8/2024 ............. H04R 25/50
CN 119071707 A * 12/2024 ............. H04R 25/00
EP 3229489 A1 * 10/2017 ........... H04R 25/552
EP 3383067 10/2018
EP 4287657 A1 * 12/2023 ........... H04R 25/407
(Continued)

OTHER PUBLICATIONS

Extended European Search Report for EP Patent Appln. No. EP 24175608.9 dated Oct. 9, 2024.

*Primary Examiner* — Phylesha Dabney
(74) *Attorney, Agent, or Firm* — Vista IP Law Group, LLP

(57) ABSTRACT

A hearing device comprises: a transceiver module configured to receive a contralateral directional input signal from the contralateral hearing device; a first BTE microphone for provision of a first BTE microphone input signal; a second BTE microphone for provision of a second BTE microphone input signal; a first MIE microphone for provision of a first MIE microphone input signal; a first beamformer for provision of a directional input signal based on the first BTE microphone input signal and the second BTE microphone input signal; a second beamformer for provision of a binaural beamform signal based on a binaural transfer function, the directional input signal, and the contralateral directional input signal; a spatializer for provision of a spatial binaural beamform signal based on the binaural beamform signal and a spatialization transfer function; and a processor configured to provide an electrical output signal based on the spatial binaural beamform signal.

21 Claims, 5 Drawing Sheets

(56) References Cited

FOREIGN PATENT DOCUMENTS

| | | | | |
|---|---|---|---|---|
| EP | 4472239 A1 * | 12/2024 | ............. | H04R 25/00 |
| WO | WO 2020/245232 | 12/2020 | | |
| WO | WO 2022/248020 | 12/2022 | | |

* cited by examiner

HEARING DEVICE HAVING BILATERAL BEAMFORMING WITH BINAURAL CUES

FIELD

The present disclosure relates to a hearing device for a binaural hearing system and related methods including a method of operating a hearing device.

BACKGROUND

People with a hearing loss often experience difficulties understanding speech in noisy environments. Listening devices, including hearing devices with compensation for a hearing loss, with directional sound capture, such as with spatial filtering, can be an option to improve intelligibility of speech in noisy environments, such as to improve signal-to-noise ratio (SNR). Use of directional microphones including beamforming methods involving multiple microphones and arrays of multiple microphones on both sides of a user in an ipsilateral device also denoted first device and in a contralateral device also denoted second device can be an option to obtain directional sound capture. Beamforming microphone arrays in listening devices can improve the SNR and thus enhancing speech intelligibility. Challenges still remain in recovering and maintaining binaural cues of sound sources.

SUMMARY

Accordingly, there is a need for hearing devices and methods with improved spatial cueing of sound sources.

Disclosed is a hearing device for a binaural hearing system. The hearing device comprises a transceiver module for communication with a contralateral hearing device of the binaural system. The transceiver module is configured to receive contralateral data from the contralateral hearing device, the contralateral data optionally comprising a contralateral directional input signal. The hearing device comprises a set of microphones comprising a first BTE microphone for provision of a first BTE microphone input signal, optionally a second BTE microphone for provision of a second BTE microphone input signal, and optionally a first MIE microphone for provision of a first MIE microphone input signal. The hearing device comprises a first beamformer connected to the first BTE microphone and/or the second BTE microphone for provision of a directional input signal based on the first BTE microphone input signal and/or the second BTE microphone input signal. The hearing device comprises a second beamformer connected to the first beamformer and the transceiver module for provision of a binaural beamform signal based on a binaural transfer function, the directional input signal, and the contralateral directional input signal. The hearing device comprises a spatializer connected to the second beamformer for provision of a spatial binaural beamform signal based on the binaural beamform signal and a spatialization transfer function. The hearing device comprises a processor configured to provide an electrical output signal based on the spatial binaural beamform signal; and a receiver for converting the electrical output signal to an audio output signal.

Also, a binaural hearing system is disclosed, the binaural hearing system comprising a first hearing device and a second hearing device, wherein the first hearing device is a hearing device as disclosed herein and the second hearing device is a hearing device as disclosed herein.

The present disclosure allows for improved spatial discrimination of sound sources associated with different spatial locations. Improved speech intelligibility in noisy environments is provided.

The present disclosure allows reducing undesired sound sources while preserving binaural cues of sound sources to preserve the user's spatial impression of an acoustic environment.

The present disclosure allows controlling suppression of the axis sources in a flexible manner by applying masking techniques to the sound sources, e.g. to the directional input signal and the contralateral input signal.

The present disclosure allows transplantation of the binaural cues into the binaural beamform signal, e.g. in the sound sources in focus direction of the first beamformer, thus easing the task of sound source segregation, e.g. for sound sources in front and/or back of user's head. Thus, improved sound source segregation is provided.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
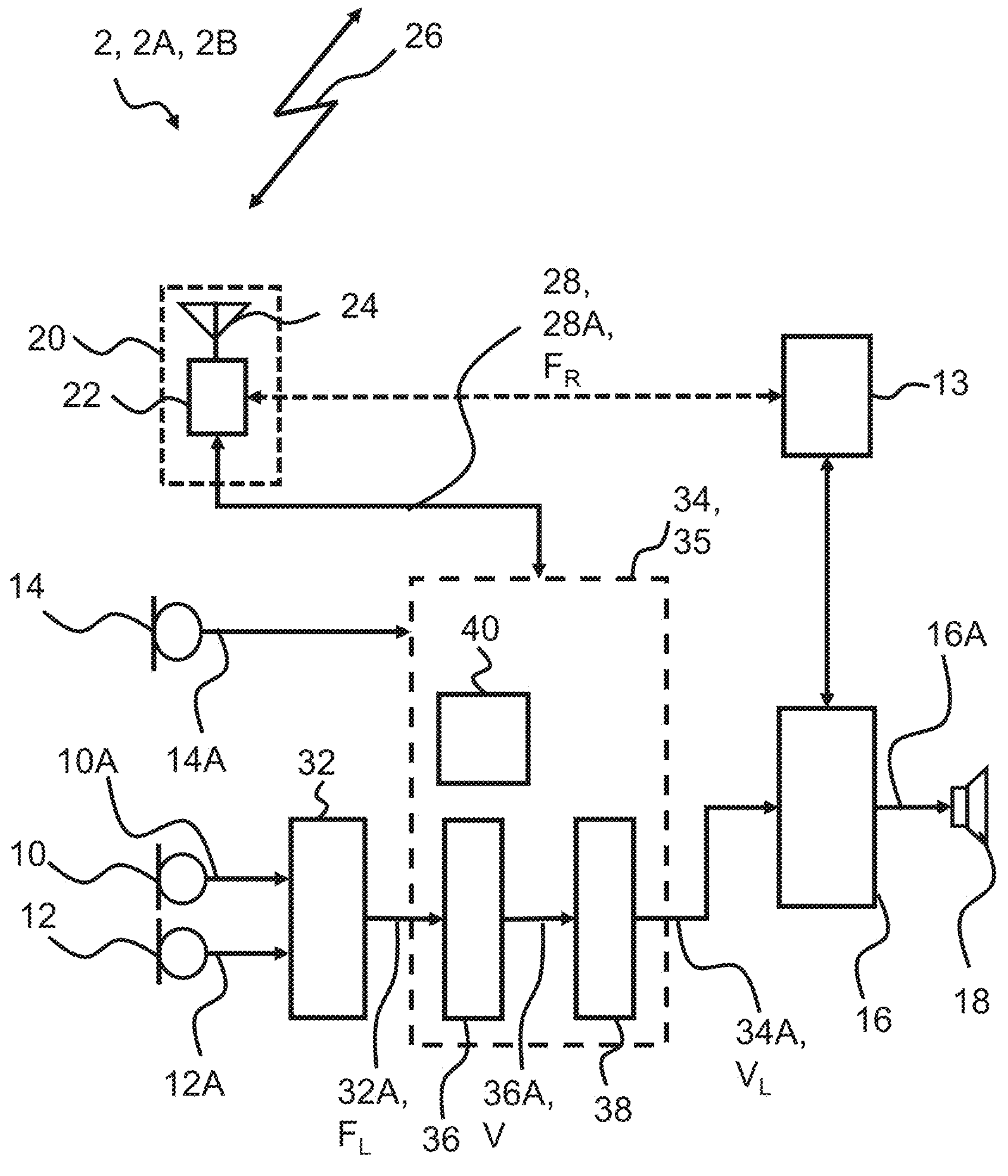
FIG. 1 schematically illustrates an example hearing device according to this disclosure, FIG. 2 schematically illustrates an example binaural cue recovering module according to the disclosure, FIG. 3 schematically illustrates an example binaural cue recovering module according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device also denoted first hearing device and/or second hearing device is disclosed, e.g. a hearing device for a binaural hearing system. The hearing device may be configured to be worn at an ear of a user and may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type, receiver-in-the-ear (RITE) type, or microphone-in-ear (MIE) type. The hearing aid may be a binaural hearing aid. The hearing device may comprise a first earpiece and a second earpiece, wherein the first earpiece and/or the second earpiece is an earpiece as disclosed herein.

The hearing device may be configured for wireless communication with one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone, e.g. a first BTE microphone, for provision of a first microphone input signal, e.g. a first BTE microphone input signal. The first BTE (Behind-The-Ear) microphone is arranged in a housing configured to be arranged behind the ear of a user. The set of microphones comprises a second microphone, e.g. a second BTE microphone, for provision of a second microphone input signal, e.g. a second BTE microphone input signal. The second BTE (Behind-The-Ear) microphone is optionally arranged in a housing configured to be arranged behind the ear of a user. The set of microphones optionally comprises a third microphone, e.g. a first MIE microphone, for provision of a third microphone input signal, e.g. a first MIE microphone input signal. The first MIE microphone is arranged near, at or in the ear canal of the user, e.g. in an earpiece connected by wire to a BTE housing. The set of microphones may comprise N microphones for provision of N microphone signals, wherein N is an integer in the range from 1 to 10. In one or more example hearing devices, the number N of microphones is two, three, four, five or more.

The hearing device comprises a processor for processing input signals, such as the spatial binaural beamform signal. The processor is optionally configured to compensate for hearing loss of a user of the hearing device. The processor provides an electrical output signal based on the input signals to the processor, such as based on the spatial binaural beamform signal.

In one or more examples, the hearing device comprises a transceiver module for communication with a contralateral hearing device of the binaural system, the transceiver module configured to receive contralateral data from the contralateral hearing device, the contralateral data comprising a contralateral directional input signal; a set of microphones comprising a first BTE microphone for provision of a first BTE microphone input signal, a second BTE microphone for provision of a second BTE microphone input signal, and a first MIE microphone for provision of a first MIE microphone input signal; a first beamformer connected to the first BTE microphone and the second BTE microphone for provision of a directional input signal based on the first BTE microphone input signal and the second BTE microphone input signal; a second beamformer connected to the first beamformer and the transceiver module for provision of a binaural beamform signal based on a binaural transfer function, the directional input signal, and the contralateral directional input signal; a spatializer connected to the second beamformer for provision of a spatial binaural beamform signal based on the binaural beamform signal and a spatialization transfer function; a processor configured to provide an electrical output signal based on the spatial binaural beamform signal; and a receiver for converting the electrical output signal to an audio output signal.

Listening to spatially distributed sound sources can provide several benefits, including spatial awareness, spatial unmasking, a higher quality sound experience, enhanced communication, and increased safety. The brain has evolved to process binaural cues and integrate different sensory modalities to create an accurate spatial representation of the environment, enabling the listener to identify and locate sound sources effectively.

Spatial unmasking is a phenomenon that occurs when the listener can differentiate between sounds from different directions, even when the sounds overlap in time and frequency. This ability is crucial in noisy environments, where the listener needs to focus on a particular sound source while ignoring other distracting sounds. Listening to spatially distributed sound sources can enhance spatial unmasking by providing the necessary binaural cues for the brain to separate sounds from different sources effectively.

Overall, listening to spatially distributed sound sources provides several advantages that can enhance the listening experience and promote safety in various contexts. The ability of the brain to process binaural cues and integrate different sensory modalities to create an accurate spatial representation of the environment is essential for successful navigation and survival.

The present disclosure provides improved auditory source segregation by increasing the frequency separation, temporal separation, and/or spatial separation of sources.

Advantageously, reintroducing auditory source segregation cues while preserving noise suppression can improve encoding of auditory sources, reduce listening effort, and benefit the quality of the listening experience in noise. Users are supported to optimize source segregation for less effortful directed auditory attention.

The hearing device comprises a first beamformer connected to the first BTE microphone and/or the second BTE microphone, the first beamformer configured to combine, such as beamform, the first BTE microphone input signal and the second BTE microphone input signal, for provision of a directional input signal. The first beamformer may be a bilateral beamformer. The first beamformer may be an adaptive beamformer. The first beamformer may cause a loss of binaural cues, e.g. interaural time difference (ITD) and interaural level difference (ILD), included in the first BTE microphone input signal and the second BTE microphone input signal. A binaural cue can be seen as a spatial cue used to locate a sound source, e.g. for determining direction and/or azimuth of a sound source.

In one or more example hearing devices, the first beamformer is connected to the first MIE microphone, the first beamformer configured to combine, such as beamform, the first BTE microphone input signal and the first MIE microphone input signal, for provision of a directional input signal.

The hearing device may comprise a binaural cue recovering module connected to the first beamformer, the transceiver module, and the processor, the binaural cue recovering module configured to reintroduce the binaural cues in the directional input signal. In other words, the binaural cue recovering module may be configured to generate the binaural cues for sound sources in the focus of the first beamformer.

It is noted that descriptions and features of hearing device functionality, such as hearing device configured to, also apply to methods and vice versa. For example, a description of a hearing device configured to determine also applies to a method, e.g. of operating a hearing device, wherein the method comprises determining and vice versa.

In one or more example hearing devices, the hearing device comprises a transceiver module for communication with a contralateral hearing device, also denoted second hearing device, of the binaural hearing system. In one or more example hearing devices, the transceiver module is configured to receive contralateral data from the contralateral hearing device. In one or more example hearing devices, the contralateral data comprises a contralateral directional input signal also denoted $F_R$. In other words, the contralateral data is optionally representative of the contralateral directional input signal.

In one or more example hearing devices, the hearing device comprises a set of microphones comprising a first BTE microphone for provision of a first BTE microphone input signal, a second BTE microphone for provision of a second BTE microphone input signal, and a first MIE microphone for provision of a first MIE microphone input signal also denoted $F_{mie\text{-}L}$.

In one or more example hearing devices, the hearing device comprises a first beamformer connected to the first BTE microphone and the second BTE microphone for provision of a directional input signal also denoted $F_L$ based on the first BTE microphone input signal and the second BTE microphone input signal. In one or more examples, the first beamformer maintains a sound signal at a zero-degree azimuth undistorted, e.g. the directional input signal, while suppressing the off-axis sound sources. In one or more examples, the first beamformer is a bilateral beamformer. In one or more examples, the directional input signal is a bilateral beamform signal. In one or more examples, the directional input signal and the contralateral directional input signal are associated with a same sound source, with the contralateral directional input signal differing from the directional input signal in terms of arrival times and intensity, e.g. sound pressure levels, of the corresponding original input signal obtained by the contralateral ear and ipsilateral ear, respectively.

In one or more example hearing devices, the hearing device comprises a second beamformer connected to the first beamformer and the transceiver module for provision of a binaural beamform signal also denoted V based on a binaural transfer function also denoted H, the directional input signal, and the contralateral directional input signal. In one or more examples, the second beamformer is configured to combine the binaural transfer function, the direction input signal, and the contralateral directional input signal for provision of the binaural beamform signal. In one or more examples, the binaural beamform signal is a function of the binaural transfer function.

In one or more example hearing devices, the hearing device comprises a spatializer connected to the second beamformer for provision of a spatial binaural beamform signal also denoted $V_L$ based on the binaural beamform signal and a spatialization transfer function also denoted $H_L$. In one or more examples, the spatialization transfer function can be seen as an interaural transfer function, e.g. a transfer function embedding ITD and/or ILD information of the source signals.

In one or more example hearing devices, the hearing device comprises a binaural cue recovering module for provision of the binaural beamform signal, based on the contralateral directional input signal and the directional input signal. In one or more example hearing devices, the binaural cue recovering module comprises the second beamformer, the spatializer, and a beamform controller. In one or more examples, the binaural cue recovering module may be configured to perform spatialized bilateral beamforming on the contralateral directional input signal and the directional input signal.

The hearing device comprises a processor configured to provide an electrical output signal based on the spatial binaural beamform signal. The hearing device comprises a receiver for converting the electrical output signal to an audio output signal.

In one or more example hearing devices, the binaural cue recovering module, such as the second beamformer, is connected to the first MIE microphone and configured to determine the binaural transfer function based on the first MIE microphone input signal from the first MIE microphone.

In one or more example hearing devices, the beamform controller is connected to the first MIE microphone and configured to determine the binaural transfer function based on the first MIE microphone input signal from the first MIE microphone.

In one or more examples, a beamform controller, e.g. of the second beamformer and/or of the binaural cue recovering module, is configured to determine the binaural transfer function, e.g. based on the first MIE microphone input signal.

In one or more example hearing devices, the contralateral data comprises a contralateral MIE microphone input signal of contralateral MIE microphone. The second beamformer may be configured to determine the binaural transfer function based on the contralateral MIE microphone input signal.

In one or more example hearing devices, the binaural beamform signal V is given by:

$$V = F_L H + F_R(1 - H),$$

where $F_L$ is the directional input signal, $F_R$ is the contralateral directional input signal, and H is the binaural transfer function. In one or more examples, the binaural beamform signal is a combination of the directional input signal and the contralateral directional input signal. In one or more examples, $F_L$ and $F_R$ are frequency-domain signals. In one or more examples, H is a frequency-domain transfer function. In one or more examples, H is an equalization filter. In one or more example hearing devices, H satisfies $0<H<1$.

In one or more example hearing devices, the binaural transfer function is estimated using an adaptive procedure to minimize the power of the binaural beamform signal. In one or more examples, the binaural transfer function at iteration i is adaptatively determined as follows:

$$H_i = H_{i-1} + \mu\frac{V_{i-1}^* \cdot (F_L - F_R)}{V_{i-1}^* \cdot V_{i-1}},$$

where $H_{i-1}$ is the binaural transfer function at iteration i−1, $V_{i-1}$ is the binaural beamform signal at iteration i−1, $V^*_{i-1}$ is the conjugate of the binaural beamform signal at iteration i−1, and μ is a constant. In one or more examples, $V^*_{i-1} \cdot V_{i-1}$ is the power of the binaural beamform signal at iteration i−1. In one or more examples, the second component of $H_i$ can be seen as an adaptive factor. The constant μ is also denoted the step size and may be in the range from 0.00001 and 0.005.

In one or more examples, the binaural transfer function $H_i$ is determined based on the binaural beamform signal $V_{i-1}$. In one or more examples, the binaural beamform signal at iteration i−1 is given by:

$$V_{i-1} = H_{i-1}F_L + F_R(1 - H_{i-1}).$$

In one or more examples, an updated version of the binaural beamform signal $V_{i-1}$, such as updated binaural beamform signal $V_i$ is given by:

$$V_i = H_iF_L + F_R(1 - H_i).$$

In one or more examples, the binaural transfer function H, e.g. $H_i$, can be iteratively determined by a previous version of the binaural transfer function H, e.g. $H_{i-1}$, and a previous version of the binaural beamform signal V, e.g. $V_{i-1}$. In one or more examples, the binaural beamform signal V, e.g. $V_i$, can be iteratively determined by the binaural transfer function H, e.g. $H_i$.

The binaural beamform signal may be based on a minimum and/or a maximum of the directional input signal and the contralateral directional input signal.

In one or more example hearing devices, the binaural beamform signal is given by:

$$V = \max(F_L, F_R)H + \min(F_L, F_R)(1 - H),$$

where $F_L$ is the directional input signal, $F_R$ is the contralateral directional input signal, and H is the binaural transfer function. In one or more examples, for a source at zero-degree azimuth, $F_L = F_R$, and $V = F_R$, which satisfy the distortionless constraint, such as avoiding binaural cues distortion, thus ensuring preservation of the binaural cues.

The binaural beamform signal may be based on a masking transfer function, the masking transfer function optionally based on the binaural transfer function.

Accordingly, and in one or more examples, the beamform controller/second beamformer may be configured to determine the masking transfer function based on the binaural transfer function. The second beamformer may be configured to provide the binaural beamform signal based on the masking transfer function, the directional input signal, and the contralateral directional input signal.

In one or more examples, the masking transfer function is based on a smoothing function, such as a smoothing exponential function, optionally applied to the binaural transfer function.

In one or more example hearing devices, the masking transfer function is given by:

$$M = \exp(-c(\beta - H)),$$

where H is the binaural transfer function, c is a constant greater than zero and β≥1. In one or more examples, c is in the range from 1 to 5, such as 1.5, optionally combined with a β in the range from 1.5 to 5, such as 2. In an example c=1.5 and β=2.

In one or more examples, the masking transfer function is determined or generated based on the binaural transfer function. Put differently, the binaural transfer function may be transformed and/or converted into the masking transfer function using the smoothing exponential function.

In one or more example hearing devices, the masking transfer function is given by:

$$M = \frac{\exp(-c(\beta - H))}{\exp(-c(\beta - H)) + \exp(-cH)},$$

where H is the binaural transfer function, c is a constant greater than zero and β≥1. In one or more examples, c is in the range from 1 to 5, such as 2, optionally combined with a β in the range from 1 to 5, such as 2. In an example c=2 and β=1.

In one or more examples, the masking transfer function is generated using a sigmoid function. In one or more examples, the binaural transfer function can be transformed and/or converted into the masking transfer function using the sigmoid function.

In one or more example hearing devices, the binaural beamform signal is given by:

$$V = \max(F_L, F_R)M + \min(F_L, F_R)(1 - M),$$

where $F_L$ is the directional input signal, $F_R$ is the contralateral directional input signal, and M is a masking transfer function. In one or more examples, the masking transfer function is a binaural mask for beamforming. The present disclosure enables a more flexible control of the suppression of the off-axis sources by using the masking transfer function to provide the binaural beamform signal.

The spatializer is configured to provide a spatial binaural beamform signal based on the binaural beamform signal and a spatialization transfer function, e.g. by applying the spatialization transfer function to the binaural beamform signal.

In one or more example hearing devices, the binaural beamform signal is spatialized binaurally into the spatial binaural beamform signal $V_L$ by:

$$V_L = |V|H_L,$$

where |V| is the magnitude of the complex binaural beamform signal V and $H_L$ is the spatialization transfer function.

The spatialization transfer function restores and/or maintain the ITD and ILD relationship in the binaural beamform signals.

The present disclosure enables preservation of binaural cues for improving accuracy of sound source localization.

The present disclosure allows transplantation of the binaural cues, e.g. ILD and ITD information, into the directional input signal. Perceptually, a user can benefit from the binaural cues embedded in the directional input signal as the binaural cues of all sound sources in an acoustic scene are preserved, in turn preserving the user's spatial impression of the acoustic scene.

In one or more examples, the disclosed techniques are implemented in frequency domain with short-time Fourier transforms. In one or more examples, the directional input signal and the contralateral directional input signal are transformed into a time-frequency (T-F) representation, the T-F representation comprising T-F units, each one corresponding to a time and a frequency. In other words, the present disclosure may comprise applying a T-F masking techniques to the directional input signal and the contralateral directional input signal.

In one or more examples, the binaural transfer function/masking function can be seen as a Time-Frequency (T-F) masking technique, e.g. Ideal Binary Mask (IBM) and/or an Ideal Ratio Mask (IRM), that can be estimated from the directional input signal and the contralateral input signal. In one or more examples, the IBM and IRM techniques can be used to enhance a masking effect on softer sounds to improve speech intelligibility in noisy conditions. For example, the IRM technique designates a value between 0 and 1 based on the SNR. For example, the IBM technique takes values either 0 or 1. Expressed in a generic manner, after applying the IBM and IRM techniques to a sound source, the soft sound becomes inaudible and/or less audible in some of the speech segments.

For multiple speakers, sources may be statistically independent, e.g. voices from each speaker in noisy environments are not related. Time-Frequency (T-F) units may be sparsely associated with one dominant speaker. Detection of dominance may become easier due to head shadow effects for the off-axis sources. In other words, head shadow effects may increase sound localization. Input signals, such as directional input signal and contralateral input signal, may allow a user to identify the location of a sound in space.

In binaural listening, one off-axis source may be weaker in one ear, but dominant in the other ear. For example, the present disclosure may be able to suppress a stronger off-axis source while maintaining the target source, e.g. the front source, distortionless. For example, IRM and IBM techniques comprises suppressing a dominant T-F unit close to the weak side of two channels at a time t (see FIG. 4).

The binaural transfer function may be based on a minimum power and/or a maximum power of the powers of the directional input signal and the contralateral directional input signal.

The binaural transfer function may be based on a ratio or a difference between minimum power and maximum power of the directional input signal power also denoted $P_L$ and the contralateral directional input signal power also denoted $P_R$.

In one or more example hearing devices, the binaural transfer function is given by:

$$H = \sqrt{\frac{\min(P_R, P_L)}{\max(P_R, P_L)}},$$

wherein the $P_L$ is the power of the directional input signal and $P_R$ is the power of the contralateral directional input signal. In one or more examples, H satisfies $0<H\leq 1$.

In one or more example hearing devices, the binaural transfer function is given by:

$$H = \frac{\sqrt{\min(P_R, P_L)}}{\sqrt{\min(P_R, P_L)} + \sqrt{\max(P_R, P_L)}},$$

wherein $P_L$ is the power of the directional input signal and $P_R$ is the power of the contralateral directional input signal. In one or more examples, H satisfies $0<H\leq 0.5$.

The spatialization transfer function may be based on, such as a function of, a minimum power and/or a maximum power of the powers of the directional input signal and the contralateral directional input signal.

The spatialization transfer function may be based on a ratio or a difference between minimum power and maximum power of the powers of the directional input signal and the contralateral directional input signal.

The spatialization transfer function may be based on, such as a function of, the directional input signal, such as the magnitude of the directional input signal.

In one or more example hearing devices, the spatialization transfer function $H_L$ is given by:

$$H_L = F_L\sqrt{\frac{1}{\max(P_R, P_L)}},$$

wherein $F_L$ is the directional input signal, $P_L$ is the power of the directional input signal, and $P_R$ is the power of the contralateral directional input signal. In one or more examples, $H_L$ is a spatialization transfer function associated with the directional input signal.

It may not be feasible to estimate ITD and ILD information of the source signals from a multi-source mixture in order to recover the binaural cues from bilateral beamforming signals. The present disclosure allows determination and/or estimation of a spatialization transfer function that embeds the ITD and ILD information of the source signals, e.g. ITD and ILD information from the directional input signal and the contralateral directional input signal.

In one or more examples, the spatialization transfer function needs to be normalized so that it does not amplify the suppressed signals, e.g. the off-axis sound sources. In one or more examples, the spatialization transfer function is a normalized interaural transfer function (NITF). In one or more examples, the binaural cues can be estimated from the spatialization transfer function.

In one or more examples, the spatialization transfer function restores or maintains ITD and ILD relationship in the directional input signal. In one or more examples, the directional input signal is an ear-to-ear (E2E) streamed signal from a fixed monaural beamformer, e.g. a hypercardioid signal.

In one or more example hearing devices, the spatialization transfer function can be determined based on the first MIE microphone input signal from the first MIE microphone.

In one or more example hearing devices, the spatialization transfer function is given by:

$$H_L = F_{mie-L}\sqrt{\frac{1}{\max(P_R, P_L)}},$$

wherein $F_{mie\text{-}L}$ is the first MIE microphone input signal, $P_L$ is the power of the directional input signal, and $P_R$ is the power of the contralateral directional input signal. In one or more examples, $H_L$ is a spatialization transfer function associated with the first MIE microphone input signal.

In one or more example hearing devices, the spatialization transfer function can be determined based on a pinna restoration signal. In one or more example hearing devices, the spatialization transfer function is given by:

$$H_L = F_{pr-L}\sqrt{\frac{1}{\max(P_R, P_L)}},$$

wherein $F_{pr\text{-}L}$ is a pinna restoration signal, $P_L$ is the power of the directional input signal, and $P_R$ is the power of the contralateral directional input signal. In one or more examples, $H_L$ is a spatialization transfer function associated with the pinna restoration signal.

In one or more examples, the first MIE microphone input signal and the pinna restoration signal are not transmitted to the opposite side of the ears. In one or more examples, the spatialization transfer function is normalized based on the power of the directional input signal and the power of the contralateral directional input signal. In one or more examples, polar patterns associated with the pinna restoration signal and the first MIE microphone input signal can be calibrated, e.g. normalized, so that the polar patterns of the pinna restoration signal and the first MIE microphone input signal are similar to the polar patterns of the directional input signal for front sources.

In one or more examples, in view of the rear of the polar patterns of the pinna restoration signal, the amplitude of the spatialization transfer function should be less than one, e.g. no amplifications, as follows, $$H_L = \min(1, H_L),$$

so that the rear of the polar patterns of the pinna restoration signal is similar to the rear of the polar patterns of the directional input signal.

In one or more example hearing devices, the power of the directional input signal and the power of the contralateral directional input signal are given by:

$$P_L(\omega, n+1) = \gamma P_L(\omega, n) + (1-\gamma)F_L(\omega, n)F_L^*(\omega, n)$$

$$P_R(\omega, n+1) = \gamma P_R(\omega, n) + (1-\gamma)F_R(\omega, n)F_R^*(\omega, n),$$

wherein $0 \leq \gamma < 1$, $\omega = 2\pi f$ is an angular frequency, and n is an integer to indicate frame index. The frequency f may be in the range from 0 to 20 KHz.

In one or more example hearing devices, the hearing device, such as the binaural cue recovering module, comprises a beamform controller for provision of the binaural transfer function and the spatialization transfer function. In one or more examples, the beamform controller is configured to determine the binaural transfer function based on the power of the directional input signal and the power of the contralateral directional input signal. In one or more examples, the beamform controller is configured to determine the spatialization transfer function based on the power of the directional input signal, the power of the contralateral directional input signal, and the directional input signal. In one or more examples, the beamform controller is configured to determine the spatialization transfer function based on the power of the directional input signal, the power of the contralateral directional input signal, and the first MIE microphone input signal. In one or more examples, the beamform controller is configured to determine the spatialization transfer function based on the power of the directional input signal, the power of the contralateral directional input signal, and the pinna restoration signal. The beamform controller outputs the binaural transfer function or control signals representing the binaural transfer function to the second beamformer thereby enabling the second beamformer to apply the binaural transfer function to the directional input signal and the contralateral directional input signal. The beamform controller outputs the spatialization transfer function or control signals representing the spatialization transfer function to the spatializer thereby enabling the spatializer to apply the spatialization transfer function to the binaural beamform signal for provision of the spatial binaural beamform signal.

FIG. 1 shows an example hearing device 2, such as a first hearing device 2A and/or a second hearing device 2B, according to this disclosure. In one or more examples, the first hearing device 2A is an ipsilateral hearing device. In one or more examples, the second hearing device 2B is a contralateral hearing device. The hearing device 2 comprises a transceiver module 22 for communication with a contralateral hearing device, e.g. hearing device 2B. The transceiver module 22 is configured to receive contralateral data 28 from the contralateral hearing device, the contralateral data 28 comprising a contralateral directional input signal 28A. The hearing device 2 comprises a set of microphones including a first BTE microphone 10 for provision of a first BTE microphone input signal 10A, a second BTE microphone 12 for provision of a second BTE microphone input signal 12A, and a first MIE microphone 14 for provision of a first MIE microphone input signal 14A. The hearing device 2 comprises a first beamformer 32 connected to the first BTE microphone 10 and the second BTE microphone 12 for provision of a directional input signal 32A based on the first BTE microphone input signal 10A and the second BTE microphone input signal 12A. The hearing device 2 comprises a binaural cue recovering module 34 connected to the first beamformer 32, the transceiver module 22, and a processor 16 for provision of a spatial binaural beamform signal 34A. The hearing device 2 comprises a processor 16 for processing the spatial binaural beamform signal 34A for provision of an electrical output signal 16A. The hearing device 2 comprises a receiver 18 for converting the electrical output signal 16A to an audio output signal.

The hearing device 2 comprises a wireless communication unit 20 including a transceiver module 22 coupled to an antenna 24. The wireless communication unit 20 is configured for wireless communication as indicated by arrow 26, e.g. with a contralateral hearing device of a binaural hearing system. The transceiver module 22 and/or the wireless communication 20 is configured to receive contralateral data 28 from the contralateral hearing device, the contralateral data 28 comprising a contralateral directional input signal 28A.

The binaural cue recovering module 34, 35 comprises second beamformer 36, spatializer 38, and beamform controller 40, and is configured to provide the spatial binaural beamform signal 34A to the processor 16. The spatial binaural beamform signal 34A may be seen as the directional input signal 32A including information indicative of binaural spatial cues, such as spatial cues ILD and ITD.

Figure 2:
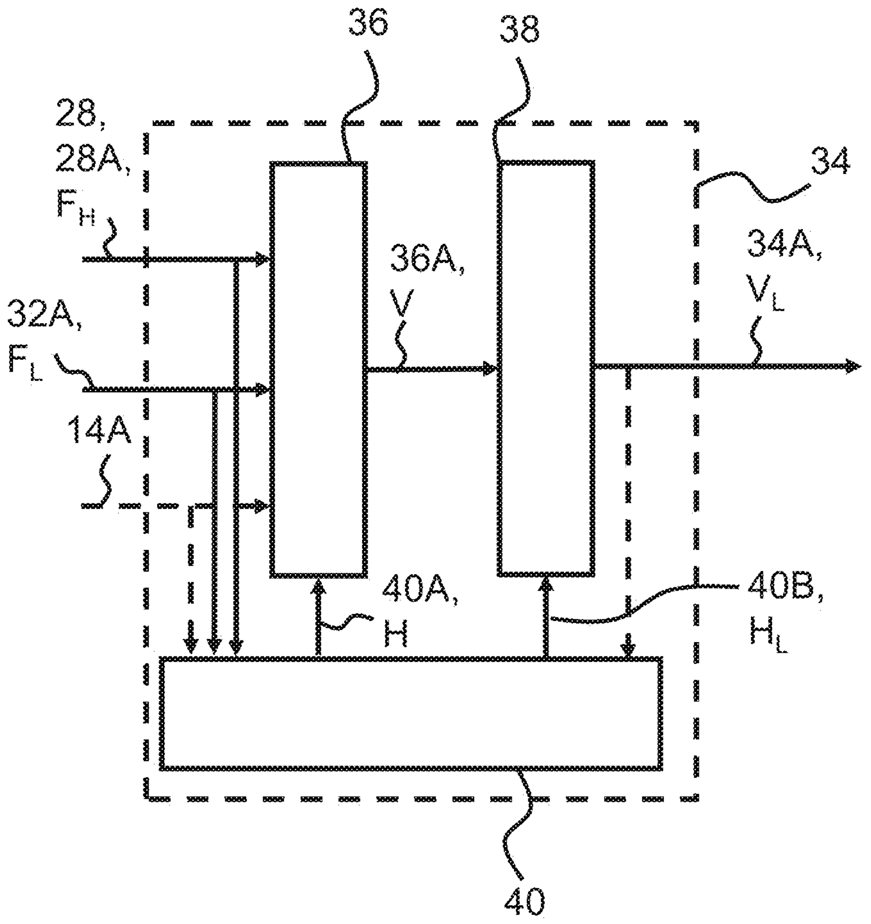

FIG. 2 shows an example binaural cue recovering module 34 according to the disclosure. The binaural cue recovering module 34 comprises a second beamformer 36 for provision of a binaural beamform signal 36A based on a binaural transfer function 40A, the directional input signal 32A, and the contralateral data 28 comprising the contralateral directional input signal 28A. The binaural cue recovering module 34 comprises a spatializer 38 connected to the second beamformer 36 for provision of a spatial binaural beamform signal 38A based on the binaural beamform signal 36A and a spatialization transfer function 40B. In one or more examples, the binaural cue recovering module 34 comprises a beamform controller 40 for provision of binaural transfer function 40A, such as H as described herein, to the second beamformer 36 and for provision of the spatialization transfer function 40B, such as $H_L$ as described herein to the spatializer. In one or more examples, the second beamformer 36 is configured to transform the binaural transfer function 40A to a masking transfer function, such as masking transfer function M as described herein and apply the masking transfer function to input signals 28A, 32A.

Figure 3:
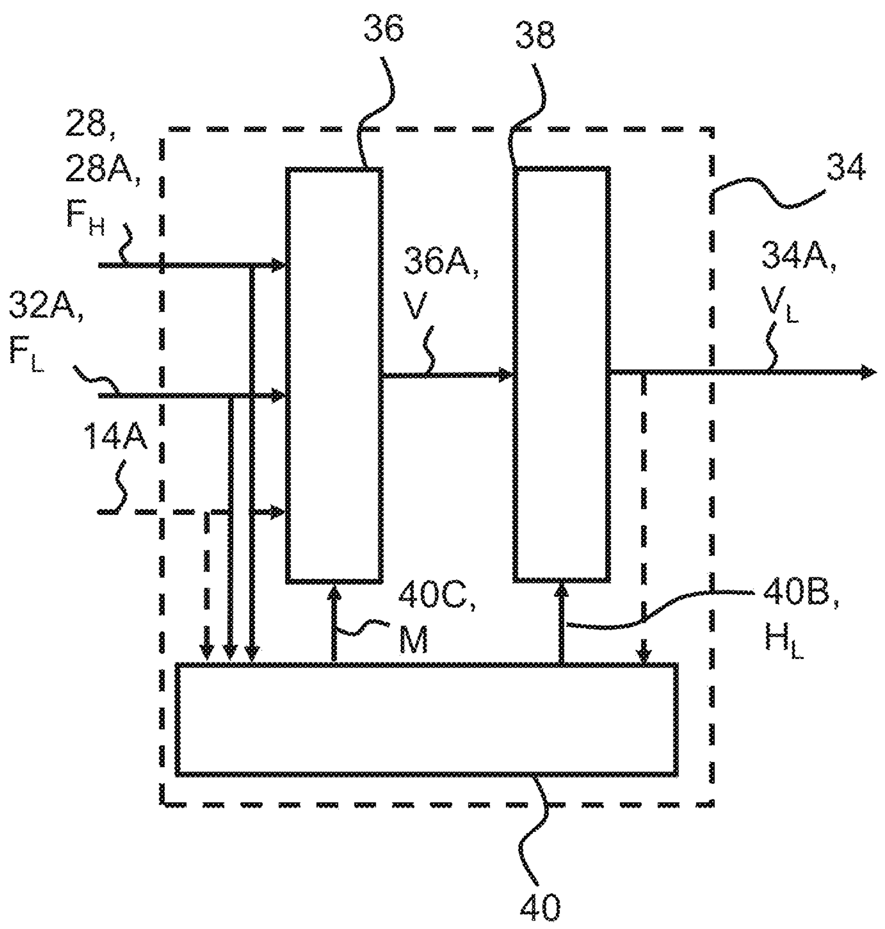

FIG. 3 shows an example binaural cue recovering module 35 according to the disclosure. The binaural cue recovering module 35 comprises a second beamformer 36 for provision of a binaural beamform signal 36A based on masking transfer function 40C, the directional input signal 32A, and the contralateral data 28 comprising the contralateral directional input signal 28A. The binaural cue recovering module 35 comprises a spatializer 38 connected to the second beamformer 36 for provision of a spatial binaural beamform signal 38A based on the binaural beamform signal 36A and a spatialization transfer function 40B. In one or more examples, the binaural cue recovering module 35 comprises a beamform controller 40 for provision of masking transfer function 40C, such as masking transfer function M as described herein, based on a binaural transfer function, such as H as described herein, to the second beamformer 36 and for provision of the spatialization transfer function 40B, such as $H_L$ as described herein to the spatializer 38.

Figure 4:
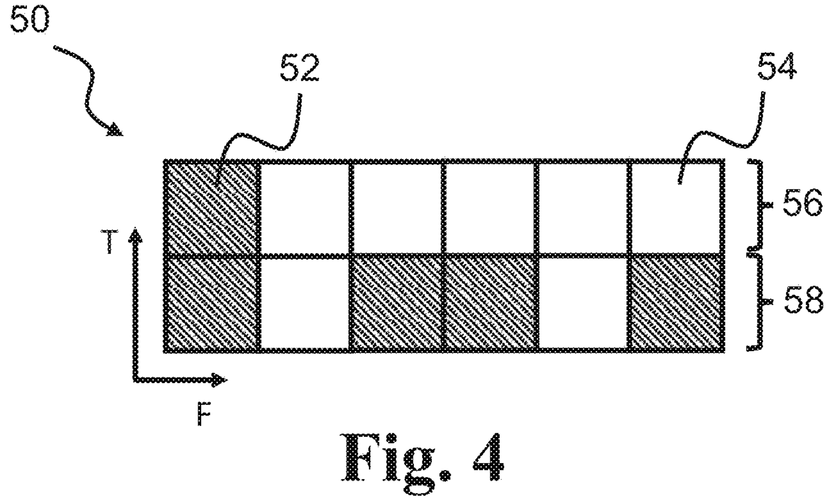
FIG. 4 illustrates an example representation of a mask transfer function according to the disclosure.

FIG. 4 shows an example representation of a mask transfer function 50 according to the disclosure. FIG. 3 shows a representation of a mask transfer function 50 in T-F units. The mask 50 may be generated by comparing the powers of the T-F units from two channels, e.g. a first channel 56 and second channel 58. In other words, the mask 50 may be seen as a masking transfer function also denoted as M, e.g. generated based on a binaural transfer function also denoted as H. For example, the first channel 56 is a first hearing channel, e.g. a contralateral hearing channel. For example, the second channel 58 is a second hearing channel, e.g. an ipsilateral hearing channel.

A T-F unit associated with a pattern, such as T-F unit 52, is associated with a first sound source, e.g. a source obtained by a left ear by means of the contralateral hearing device, e.g. a contralateral directional input signal also denoted as $F_R$. A T-F unit associated with a white color, such as T-F unit 54, is associated with a second sound source, e.g. a source obtained by a right ear by means of the ipsilateral hearing device, e.g. a directional input signal also denoted as $F_L$. For example, the first channel 56 is dominated by the second sound source, whereas the second channel 58 is dominated by the first sound source.

Figure 5A:
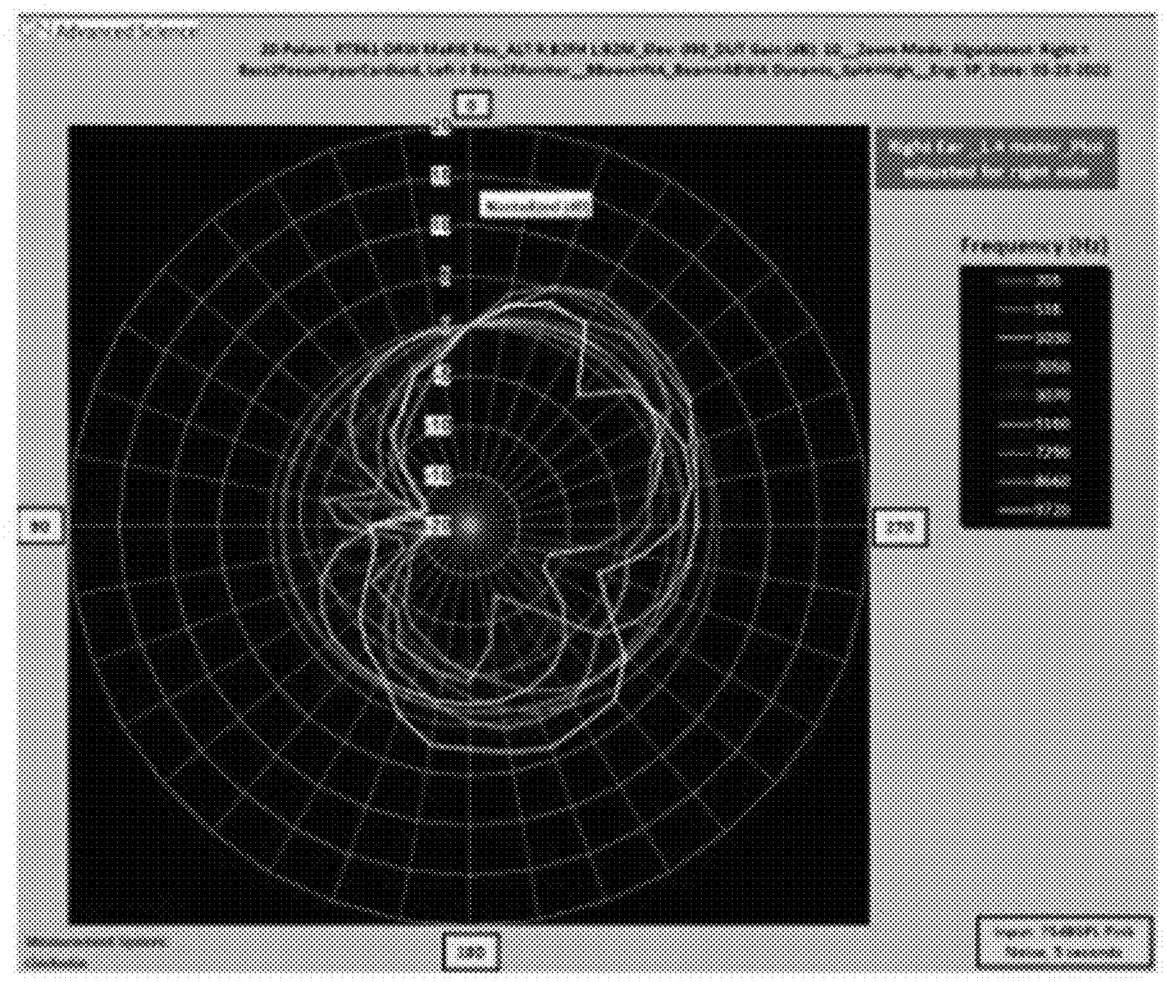
FIGS. 5A-5B illustrate example graphs illustrating polar patterns of a directional input signal and a pinna restoration signal.
Figure 5B:
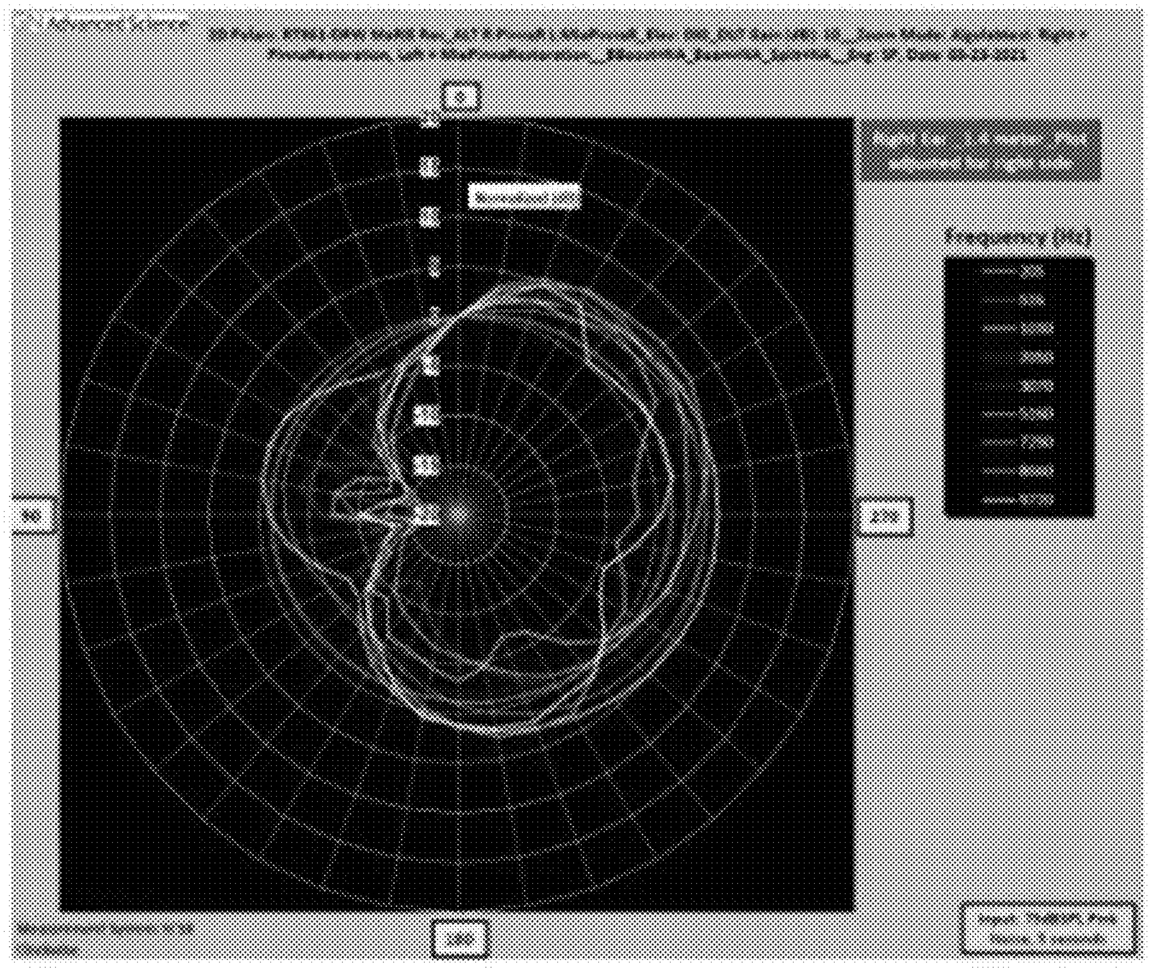

FIGS. 5A-5B show example graphs illustrating polar patterns of a directional input signal, e.g. a hyper-cardioid signal, and a pinna restoration signal. FIG. 5A illustrates polar patterns associated with the directional input signal. FIG. 5B illustrates polar patterns associated with the pinna restoration signal.

FIGS. 5A-5B show that the polar patterns for the directional input signal and the pinna restoration signal are similar in an azimuthal range of (−30,30) degrees. However, the polar patterns for the directional input signal and the pinna restoration signal may differ near the angle around the null of the polar pattern of the directional signal input.

In one or more examples, the polar patterns associated with the pinna restoration signal can be calibrated so that the polar patterns of the pinna restoration signal are similar to the polar patterns of the directional input signal for front sources. In view of the rear of the polar patterns of the pinna restoration signal, the amplitude of a spatialization transfer function should be less than one, e.g. no amplification, so that the rear of the polar patterns of the pinna restoration signal is similar to the rear of the polar patterns of the directional input signal.

Also, examples of hearing devices are disclosed according to the following items.

Item 1. A hearing device for a binaural hearing system, the hearing device comprising:

- a transceiver module for communication with a contralateral hearing device of the binaural system, the transceiver module configured to receive contralateral data from the contralateral hearing device, the contralateral data comprising a contralateral directional input signal;
- a set of microphones comprising a first BTE microphone for provision of a first BTE microphone input signal, a second BTE microphone for provision of a second BTE microphone input signal, and a first MIE microphone for provision of a first MIE microphone input signal;
- a first beamformer connected to the first BTE microphone and the second BTE microphone for provision of a directional input signal based on the first BTE microphone input signal and the second BTE microphone input signal;
- a second beamformer connected to the first beamformer and the transceiver module for provision of a binaural beamform signal based on a binaural transfer function, the directional input signal, and the contralateral directional input signal;
- a spatializer connected to the second beamformer for provision of a spatial binaural beamform signal based on the binaural beamform signal and a spatialization transfer function;
- a processor configured to provide an electrical output signal based on the spatial binaural beamform signal; and
- a receiver for converting the electrical output signal to an audio output signal.

Item 2. Hearing device according to Item 1, wherein the second beamformer is connected to the first MIE microphone and configured to determine the binaural transfer function based on the first MIE microphone input signal from the first MIE microphone.

Item 3. Hearing device according to any one of Items 1-2, wherein the contralateral data comprises a contralateral MIE microphone input signal of contralateral MIE microphone, and the second beamformer is configured to determine the binaural transfer function based on the contralateral MIE microphone input signal.

Item 4. Hearing device according to any one of Items 1-3, wherein the binaural beamform signal V is given by:

$$V = F_L H + F_R(1 - H),$$

where $F_L$ is the directional input signal, $F_R$ is the contralateral directional input signal, and H is the binaural transfer function, wherein H satisfies 0<H<1 and is estimated using an adaptive procedure to minimize the power of the binaural beamform signal.

Item 5. Hearing device according to any one of Items 1-3, wherein the binaural beamform signal V is given by:

$$V = \max(F_L, F_R)H + \min(F_L, F_R)(1 - H),$$

where $F_L$ is the directional input signal, $F_R$ is the contralateral directional input signal, and H is the binaural transfer function.

Item 6. Hearing device according to any one of Items 1-3, wherein the binaural beamform signal V is given by:

$$V = \max(F_L, F_R)M + \min(F_L, F_R)(1 - M),$$

where $F_L$ is the directional input signal, $F_R$ is the contralateral directional input signal, and M is a masking transfer function.

Item 7. Hearing device according to any one of Items 4-6, wherein the binaural beamform signal is spatialized binaurally into the spatial binaural beamform signal $V_L$ by:

$$V_L = |V| H_L,$$

where V is the binaural beamform signal and $H_L$ is the spatialization transfer function.

Item 8. Hearing device according to Item 6, wherein the masking transfer function is given by:

$$M = \exp(-c(\beta - H)),$$

where H is the binaural transfer function, c is a constant greater than zero and $\beta \geq 1$.

Item 9. Hearing device according to Item 6, wherein the masking transfer function is given by:

$$M = \frac{\exp(-c(\beta - H))}{\exp(-c(\beta - H)) + \exp(-cH)},$$

where H is the binaural transfer function, c is a constant greater than zero and $\beta \geq 1$.

Item 10. Hearing device according to any one of Items 4-9, wherein the binaural transfer function H is given by:

$$H = \sqrt{\frac{\min(P_R, P_L)}{\max(P_R, P_L)}},$$

wherein the $P_L$ is the power of the directional input signal and $P_R$ is the power of the contralateral directional input signal.

Item 11. Hearing device according to any one of Items 4-9, wherein the binaural transfer function H is given by:

$$H = \frac{\sqrt{\min(P_R, P_L)}}{\sqrt{\min(P_R, P_L)} + \sqrt{\max(P_R, P_L)}},$$

wherein the $P_L$ is the power of the directional input signal and $P_R$ is the power of the contralateral directional input signal.

Item 12. Hearing device according to any one of Items 4-9, wherein the spatialization transfer function $H_L$ is given by:

$$H_L = F_L \sqrt{\frac{1}{\max(P_R, P_L)}},$$

wherein $F_L$ is the directional input signal, $P_L$ is the power of the directional input signal, and $P_R$ is the power of the contralateral directional input signal.

Item 13. Hearing device according to any one of Items 4-9, wherein the spatialization transfer function $H_L$ is given by:

$$H_L = F_{mie-L} \sqrt{\frac{1}{\max(P_R, P_L)}},$$

wherein $F_{mie-L}$ is the first MIE microphone input signal, $P_L$ is the power of the directional input signal, and $P_R$ is the power of the contralateral directional input signal.

Item 14. Hearing device according to any one of Items 4-9, wherein the spatialization transfer function $H_L$ is given by:

$$H_L = F_{pr-L} \sqrt{\frac{1}{\max(P_R, P_L)}}$$

wherein $F_{pr-L}$ is a pinna restoration signal, $P_L$ is the power of the directional input signal, and $P_R$ is the power of the contralateral directional input signal.

Item 15. Hearing device according to any one of Items 10-14, wherein the power of the directional input signal and the power of the contralateral directional input signal are given by:

$$P_L(\omega, n+1) = \gamma P_L(\omega, n) + (1 - \gamma) F_L(\omega, n) F_L^*(\omega, n)$$

$$P_R(\omega, n+1) = \gamma P_R(\omega, n) + (1 - \gamma) F_R(\omega, n) F_R^*(\omega, n),$$

wherein $0 \leq \gamma < 1$, ω is an angular frequency, and n is an integer.

Item 16. Hearing device according to any one of Items 1-15, wherein the hearing device comprises a beamform controller for provision of the binaural transfer function and the spatialization transfer function.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2 hearing device
2A first hearing device
2B second hearing device
10 first BTE microphone
10A first BTE microphone input signal
12 second BTE microphone
12A second BTE microphone input signal
14 first MIE microphone
14A first MIE microphone input signal
13 memory
16 processor/processing unit
16A electrical output signal
18 receiver
20 wireless communication unit
22 radio transceiver
24 antenna
26 wireless communication
27 one or more contralateral input signals
28 transceiver input signals
28A contralateral microphone input signal
32 first beamformer
32A directional input signal
34, 35 binaural cue recovering module
34A spatial binaural beamform signal
36 second beamformer
36A binaural beamform signal
38 spatializer
38A spatial binaural beamform signal
40 beamform controller
40A binaural transfer function
40B spatialization transfer function
40C masking transfer function

The invention claimed is:

1. A hearing device for a binaural hearing system, the hearing device comprising:

a transceiver module configured to communicate with a contralateral hearing device of the binaural system, the transceiver module configured to receive contralateral data from the contralateral hearing device, the contralateral data comprising a contralateral directional input signal;

a set of microphones comprising a first BTE microphone for provision of a first BTE microphone input signal, a second BTE microphone for provision of a second BTE microphone input signal, and a first MIE microphone for provision of a first MIE microphone input signal;

a first beamformer connected to the first BTE microphone and the second BTE microphone for provision of a directional input signal based on the first BTE microphone input signal and the second BTE microphone input signal;

a second beamformer connected to the first beamformer and the transceiver module for provision of a binaural beamform signal based on a binaural transfer function, the directional input signal, and the contralateral directional input signal;

a spatializer connected to the second beamformer for provision of a spatial binaural beamform signal based on the binaural beamform signal and a spatialization transfer function;

a processor configured to provide an electrical output signal based on the spatial binaural beamform signal; and a receiver configured to provide an audio output signal based on the electrical output signal.

2. The hearing device according to claim 1, wherein the second beamformer is connected to the first MIE microphone.

3. The hearing device according to claim 2, wherein the second beamformer is configured to determine the binaural transfer function based on the first MIE microphone input signal from the first MIE microphone.

4. The hearing device according to claim 1, wherein the binaural transfer function is based on the first MIE microphone input signal from the first MIE microphone.

5. The hearing device according to claim 1, wherein the contralateral data comprises a contralateral MIE microphone input signal of a contralateral MIE microphone.

6. The hearing device according to claim 5, wherein the binaural transfer function is based on the contralateral MIE microphone input signal.

7. The hearing device according to claim 1, wherein the binaural beamform signal is given by:

$$V = F_L H + F_R(1 - H),$$

wherein V is the binaural beamform signal, $F_L$ is the directional input signal, $F_R$ is the contralateral directional input signal, and H is the binaural transfer function, wherein H satisfies 0<H<1.

8. The hearing device according to claim 7, wherein H is based on a minimization of a power of the binaural beamform signal.

9. The hearing device according to claim 1, wherein the binaural beamform signal is given by:

$$V = \max(F_L, F_R)H + \min(F_L, F_R)(1 - H),$$

wherein V is the binaural beamform signal, $F_L$ is the directional input signal, $F_R$ is the contralateral directional input signal, and H is the binaural transfer function.

10. The hearing device according to claim 1, wherein the binaural beamform signal is given by:

$$V = \max(F_L, F_R)M + \min(F_L, F_R)(1 - M),$$

wherein V is the binaural beamform signal, $F_L$ is the directional input signal, $F_R$ is the contralateral directional input signal, and M is a masking transfer function.

11. The hearing device according to claim 10, wherein the masking transfer function is given by:

$$M = \exp(-c(\beta - H)),$$

wherein H is the binaural transfer function, c is a constant greater than zero, and β≥1.

12. The hearing device according to claim 10, wherein the masking transfer function is given by:

$$M = \frac{\exp(-c(\beta - H))}{\exp(-c(\beta - H)) + \exp(-cH)},$$

wherein H is the binaural transfer function, c is a constant greater than zero, and β≥1.

13. The hearing device according to claim 1, wherein the binaural beamform signal is spatialized binaurally into the spatial binaural beamform signal based on:

$$V_L = |V| H_L,$$

wherein $V_L$ is the spatial binaural beamform signal, V is the binaural beamform signal, and $H_L$ is the spatialization transfer function.

14. The hearing device according to claim 1, wherein the binaural transfer function is given by:

$$H = \sqrt{\frac{\min(P_R, P_L)}{\max(P_R, P_L)}},$$

wherein H is the binaural transfer function, $P_L$ is a power of the directional input signal, and $P_R$ is a power of the contralateral directional input signal.

15. The hearing device according to claim 1, wherein the binaural transfer function is given by:

$$H = \frac{\sqrt{\min(P_R, P_L)}}{\sqrt{\min(P_R, P_L)} + \sqrt{\max(P_R, P_L)}},$$

wherein H is the binaural transfer function, $P_L$ is a power of the directional input signal, and $P_R$ is a power of the contralateral directional input signal.

16. The hearing device according to claim 1, wherein the spatialization transfer function is based on a power of the directional input signal, and a power of the contralateral directional input signal.

17. The hearing device according to claim 1, wherein the spatialization transfer function is given by:

$$H_L = F_L \sqrt{\frac{1}{\max(P_R, P_L)}},$$

wherein $H_L$ is the spatialization transfer function, $F_L$ is the directional input signal, $P_L$ is a power of the directional input signal, and $P_R$ is a power of the contralateral directional input signal.

18. The hearing device according to claim 1, wherein the spatialization transfer function is given by:

$$H_L = F_{mie-L} \sqrt{\frac{1}{\max(P_R, P_L)}},$$

wherein $H_L$ is the spatialization transfer function, $F_{mie-L}$ is the first MIE microphone input signal, $P_L$ is a power of the directional input signal, and $P_R$ is a power of the contralateral directional input signal.

19. The hearing device according to claim 1, wherein the spatialization transfer function is given by:

$$H_L = F_{pr-L}\sqrt{\frac{1}{\max(P_R, P_L)}}$$

wherein $H_L$ is the spatialization transfer function, $F_{pr-L}$ is a pinna restoration signal, $P_L$ is a power of the directional input signal, and $P_R$ is a power of the contralateral directional input signal.

20. The hearing device according to claim 1, wherein a power of the directional input signal and a power of the contralateral directional input signal are given by:

$$P_L(\omega, n+1) = \gamma P_L(\omega, n) + (1-\gamma)F_L(\omega, n)F_L^*(\omega, n)$$

$$P_R(\omega, n+1) = \gamma P_R(\omega, n) + (1-\gamma)F_R(\omega, n)F_R^*(\omega, n),$$

wherein $P_L$ is the power of the directional input signal, and $P_R$ is the power of the contralateral directional input signal, $0 \leq \gamma < 1$, $\omega$ is an angular frequency, and n is an integer.

21. The hearing device according to claim 1, wherein the hearing device comprises a beamform controller for provision of the binaural transfer function and the spatialization transfer function.

* * * * *